United States Patent
Huang et al.

(10) Patent No.: US 11,330,304 B2
(45) Date of Patent: May 10, 2022

(54) VIDEO STREAM PROTECTION DEVICE, METHOD AND STORAGE MEDIUM

(71) Applicant: Montage LZ Technologies (Chengdu) Co., Ltd., Chengdu (CN)

(72) Inventors: Youyuan Huang, Chengdu (CN); Zhimin Qiu, Chengdu (CN); Chengqiang Liu, Chengdu (CN)

(73) Assignee: Montage LZ Technologies (Chengdu) Co., Ltd., Sichuan (CN)

(*) Notice: Subject to any disclaimer, the term of this patent is extended or adjusted under 35 U.S.C. 154(b) by 0 days.

(21) Appl. No.: 17/024,705

(22) Filed: Sep. 18, 2020

(65) Prior Publication Data
US 2021/0092452 A1     Mar. 25, 2021

(30) Foreign Application Priority Data
Sep. 19, 2019 (CN) .......................... 201910886698.4

(51) Int. Cl.
*H04N 19/70* (2014.01)
*H04N 19/46* (2014.01)
*H04N 19/44* (2014.01)

(52) U.S. Cl.
CPC ............. *H04N 19/70* (2014.11); *H04N 19/44* (2014.11); *H04N 19/46* (2014.11)

(58) Field of Classification Search
CPC ......... H04N 19/70; H04N 19/44; H04N 19/46
USPC ..................................................... 375/240.25
See application file for complete search history.

(56) References Cited

U.S. PATENT DOCUMENTS

| | | | |
|---|---|---|---|
| 2013/0038683 A1* | 2/2013 | Tsukagoshi | H04N 19/597 348/42 |
| 2019/0014337 A1* | 1/2019 | Skupin | H04N 19/119 |
| 2020/0213604 A1* | 7/2020 | Choi | H04N 19/46 |

* cited by examiner

*Primary Examiner* — Amir Shahnami
(74) *Attorney, Agent, or Firm* — Jun He Law Offices, P.C.; James J. Zhu

(57) ABSTRACT

A video stream protection device is for protecting a video stream to be decoded. The video stream contains one or more data units each having a header section and a body section, and the header section contains header information indicative of a data type of the corresponding body section. The video stream protection device comprises: an identification module for identifying the one or more data units based on respective start positions of the one or more data units; a data type detection module for obtaining the header information of the identified data units, and determining the data type of the body section of each identified data unit based on the header information of the identified data unit; and a control module for determining whether to prohibit decoding of data of each data unit based on the data type of the body section of the data unit.

26 Claims, 13 Drawing Sheets

VIDEO STREAM PROTECTION DEVICE, METHOD AND STORAGE MEDIUM

CROSS REFERENCE TO RELATED APPLICATIONS

This application is based on and claims priority to Chinese Patent Application No. 201910886698.4 filed on Sep. 19, 2019, the entire content of which is incorporated herein by reference.

TECHNICAL FIELD

The application generally relates to video decoding technology, and more particularly to a video stream protection device, method and storage medium.

BACKGROUND

In many open video decoding systems, software for decoding video streams is generally run in a non-secure layer without security protection. Thus, unauthorized application programs would probably attack non-protected processors to steal the video streams.

Thus, there is a need to improve the conventional video decoding systems to avoid unauthorized stealing of video streams.

SUMMARY

An objective of the present application is to address that video streams can be easily stolen in conventional video decoding systems.

According to an aspect of the present application, there is provided a video stream protection method, comprising: A) obtaining a video stream to be decoded, wherein the video stream contains one or more data units each having a header section and a body section, and the header section contains header information indicative of a data type of the corresponding body section; B) identifying the one or more data units based on respective start positions of the one or more data units; C) obtaining the header information of the identified data units; D) determining data types of the body sections of the data units based on the identified data units; and E) determining whether to prohibit decoding of data of each data unit based on the data type of the body section of the data unit.

In some embodiments, the video stream is in conformity with the H.264 or H.265 video codec standard, and the data units are network abstraction layer (NAL) data units.

In some embodiments, the video stream is in conformity with the MPEG2, MPEG4, VC1, AVS/AVS+ or AVS2 video codec standard, and each data unit is a data unit of the video stream which starts with a start code.

In some embodiments, the video stream is preprocessed to insert therein predetermined start code prefixes, and each data unit is a data unit of the preprocessed video stream which starts with a predetermined start code prefix.

In some embodiments, step E further comprises: for a data unit having a body section whose data type is slice type, prohibiting decoding data of the body section of the data unit.

In some embodiments, the video stream is in conformity with the H.264 video codec standard, the data units are NAL data units, and the slice type comprises one or more of the following data types of the NAL data units: non instantaneous decoder refresh (IDR) picture coded slice, coded slice data partition A, coded slice data partition B, coded slice data partition C, IDR picture coded slice, coded slice extension, coded slice extension for depth view or 3D view.

In some embodiments, step B further comprises: obtaining information indicative of a video format of the video stream to be decoded; determining one or more start code prefixes corresponding to the video stream based on the information indicative of the video format of the video stream to be decoded, wherein each start code prefix is at a start position of a data unit of the video stream; and identifying the start position of each data unit based on the one or more start code prefixes to identify each data unit of the video stream.

In some embodiments, step B further comprises: obtaining one or more start code prefixes corresponding to the video stream to be decoded, wherein each start code prefix is at a start position of a data unit of the video stream; and identifying the start position of each data unit based on the start code prefixes to identify each data unit of the video stream.

In some embodiments, in step E, prohibiting decoding of data of the data unit comprises: for a data unit having a body section whose data type is slice type, permitting only decoding data of the data unit not greater than a predetermined accumulation threshold.

In some embodiments, the body section comprises a body header and/or body data, and the predetermined accumulation threshold is equal to or greater than a total length of the header section and the body header of the data unit.

In some embodiments, step E further comprises: for a data unit having a body section whose data type is slice type, permitting only decoding data of the data unit not greater than a predetermined accumulation threshold comprises: receiving the predetermined accumulation threshold; for a data unit that has been determined having a body section whose data type is slice type, counting a length of the decoded data of the data unit; and stopping providing the data that is prohibited to be decoded to a non-secure processor that performs software decoding operation on the video stream when the counted length exceeds the predetermined accumulation threshold.

In some embodiments, the video stream to be decoded is provided from a video stream data source to a video decoder for hardware decoding and further to a non-secure processor for software decoding via the video decoder, wherein the non-secure processor is configured to perform software decoding on the video stream, and the video stream protection method is implemented by the video decoder to stop providing to the non-secure processor data that is prohibited to be decoded.

In another aspect of the present application, there is provided a video stream protection device for protecting a video stream to be decoded, wherein the video stream contains one or more data units each having a header section and a body section, the header section contains header information indicative of a data type of the corresponding body section; and wherein the video stream protection device comprises: an identification module for identifying the one or more data units based on respective start positions of the one or more data units; a data type detection module for obtaining the header information of the identified data units, and determining the data type of the body section of each identified data unit based on the header information of the identified data unit; and a control module for determining whether to prohibit decoding of data of each data unit based on the data type of the body section of the data unit.

The foregoing is a summary of the present application, may be simplified or generalized, and some details may be omitted. Thus, it should be appreciated by those skilled in the art that this part is only exemplary and illustrative, but is not intended to limit the scope of the present application in any ways. This summary part is neither intended to determine the key features or necessary features of the subject sought to be protected, nor intended to be used as a supplementary means for determining the scope of the subject sought to be protected.

BRIEF DESCRIPTION OF THE DRAWINGS

The aforementioned features and other features of the present application will be fully understood via the following specification and the appended claims in combination with the accompanying drawings. It can be understood that, these accompanying drawings merely illustrate certain embodiments in accordance with the present application and should not be considered as limitation to the scope of the present application. By using the accompanying drawings, the content of the present application will be described more explicitly and detailedly.

DETAILED DESCRIPTION

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without departing from the spirit and scope of the application. It can be understood that, the various aspects of the application described and graphically presented herein may be arranged, replaced, combined, divided and designed in many different configurations, and these different configurations are explicitly incorporated in the application.

The fast-developing video codec technology is a main driving force for the vast application of high-definition and ultra high-definition video data. H.264 and H.265 video codec standards conceptually define two technical aspects, i.e. a video coding layer (VCL) and a network abstraction layer (NAL). The VCL focuses on highly efficient expression of video content (i.e. performing data compression), while the NAL defines how to package the video information expressed by the VCL and provides header information that makes the packaged video information fit for different transmission layers or storage mediums. Such structure facilitates the packaging and priority control of information. Generally, each NAL data unit starts with a start code prefix indicating the start of the data unit. Other video codec standards have similar data formats as the H.264 or H.265 video codec standard.

Figure 1:
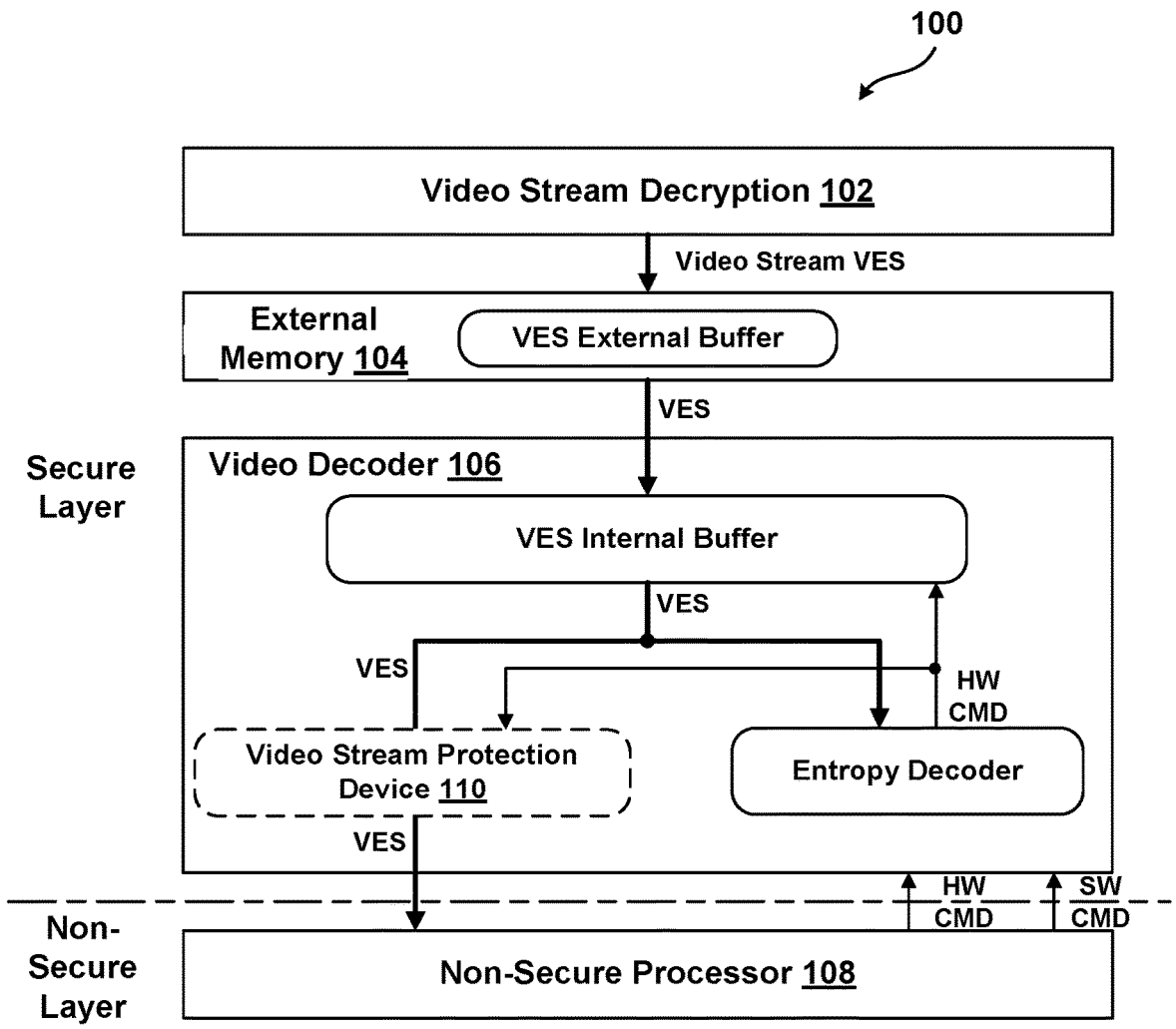
FIG. 1 shows a video decoding system 100 according to an embodiment of the present application.

In an open video decoding system, the software application layer is a non-secure layer which needs security control implemented on hardware or driver level. FIG. 1 shows a video decoding system 100 according to an embodiment of the present application, which uses a video stream protection device 110. As shown in FIG. 1, after an encrypted video elementary stream (VES) has been decrypted, the VES is transmitted to an external memory 104 and buffered there. Afterwards, a video decoder 106 reads from the external memory 104 the decrypted video stream to perform decoding operation on it. The video decoder 106 generally performs hardware decoding on the video stream with the cooperation of firmware, and the video decoder 106 and the external memory 104 are both located in a secure layer of the video decoding system 100. The firmware for performing software decoding operation can be run by a non-secure processor 108 in a non-secure layer, and the video stream may be read by the firmware to further perform software decoding on a portion of the video stream when the firmware is running. Generally, the video codec standards are open standards, which means that a hacker may play the video content using a video player of a corresponding video format after obtaining the video stream. Thus, if no video stream protection device 100 is provided in the secure layer, then hackers or unauthorized application programs may easily steal the video stream buffered in the secure layer through attacking the non-secure processor 108 in the non-secure layer. The video stream protection device 100 of the present invention is located upstream of the non-secure processor 108, and by processing the video streams, it can protect such video streams from being stolen by unauthorized programs. More details of the video stream protection device 100 will be elaborated below.

Figure 2:
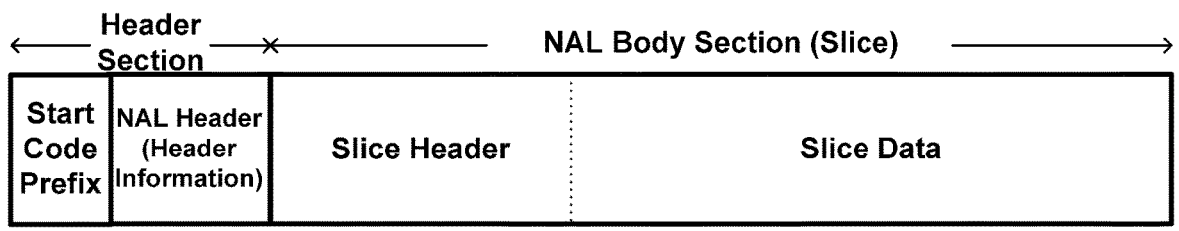
FIG. 2 shows an exemplary network abstraction layer (NAL) data unit of a H.264 video stream.

Take the H.264 video codec standard (i.e. ITU-T H.264, ISO/IEC 14496-10 standard) as an example. An original H.264 video stream is consisted of NAL data units. FIG. 2 shows an exemplary NAL data unit of the original H.264 video stream. As shown in FIG. 2, the NAL data unit contains two sections: a header section further including a start code prefix and a NAL header (storing header information, i.e. start code suffix), and a body section (payload). The start code prefix is at a start position of a data unit and thus indicates the start of the NAL data unit. For example, the start code prefix can be a 3-byte value such as "0x000001". When the video decoder detects that a data segment of the video stream matches with the value of start code prefix, it can be determined that the data segment is the start code prefix of an NAL data unit. The NAL header contains the header information indicative of a data type of the body section of the NAL data unit. For example, the data type of the NAL body section can be slice type which belongs to the video coding layer, or the data type of the NAL body section can be any other type such as sequence parameter set, picture parameter set, supplemental enhancement information (SEI) that belong to the non-video coding layer (VCL). In some examples, the NAL body section can include a body header and/or body data. For example, when the data type of the NAL body section is slice type, the NAL body section can include a slice header and slice data, as shown in FIG. 2. In some other examples, the NAL body section can include either one of the body header or the body data. For example, when the data type of the NAL body section is sequence parameter set, the NAL body section includes only one of the body header and the body data.

Taking the AVS or AVS+ video codec standard (i.e. AVS standard: GB/T 20090.2-2006, AVS+ standard: GB/T 20090.16-2016, GY/T 257.1-2012) as another example. The original AVS video stream is consisted of data units each containing a header section and a body section. The header section further contains a start code prefix and a start code suffix (the start code suffix containing header information), while the body section (e.g. payload) contains specific data. The start code prefix field is at a start position of a data unit so that it can indicate the start of the data unit. For example, the start code prefix can be a 3-byte value such as "0x000001". When the video decoder detects that a data segment of the video stream matches with the value of start code prefix, it can be determined that the data segment is the start code prefix of a data unit. The start code suffix contains the header information indicative of a data type of the body section of the data unit. For example, the data type of the body section can be slice type, or be sequence header, I picture header, PB picture header or user data, etc. In some examples, the body section can include a body header and/or body data. For example, when the data type of the body section is slice type, the body section contains a slice header (non-macroblock data of a slice) and slice data (macroblock data of the slice). In some other examples, the body section can include either one of the body header or the body data. For example, when the data type of the body section is sequence header, I picture header, PB picture header or etc., the body section may include only one of the body head and the body data.

The inventors of the present application have found that the non-slice type data such as the sequence parameter set type and the picture parameter set type, etc. is relating to the control information for decoding video streams. Generally, it is insufficient to decode the key contents of the video streams using only the non-slice type data. On the contrary, the slice type data carries coding block level information such as transform block size, prediction block size, DCT residue coefficients, motion vectors and prediction modes, which may affect the proper decoding of video streams if such slice data is lost. Thus, the key contents of the video streams can be protected by protecting such portion of data.

Based on the above inventive concept, there are provided a video stream protection device, method and storage medium. In some embodiments, the video stream protection device, method and storage medium can be arranged in a video decoder in a secure layer of a video decoding system such as the video decoding system 100 shown in FIG. 1, and be configured to prohibit the decoding of video streams by prohibiting providing to a non-secure processor the video streams.

Figure 3:
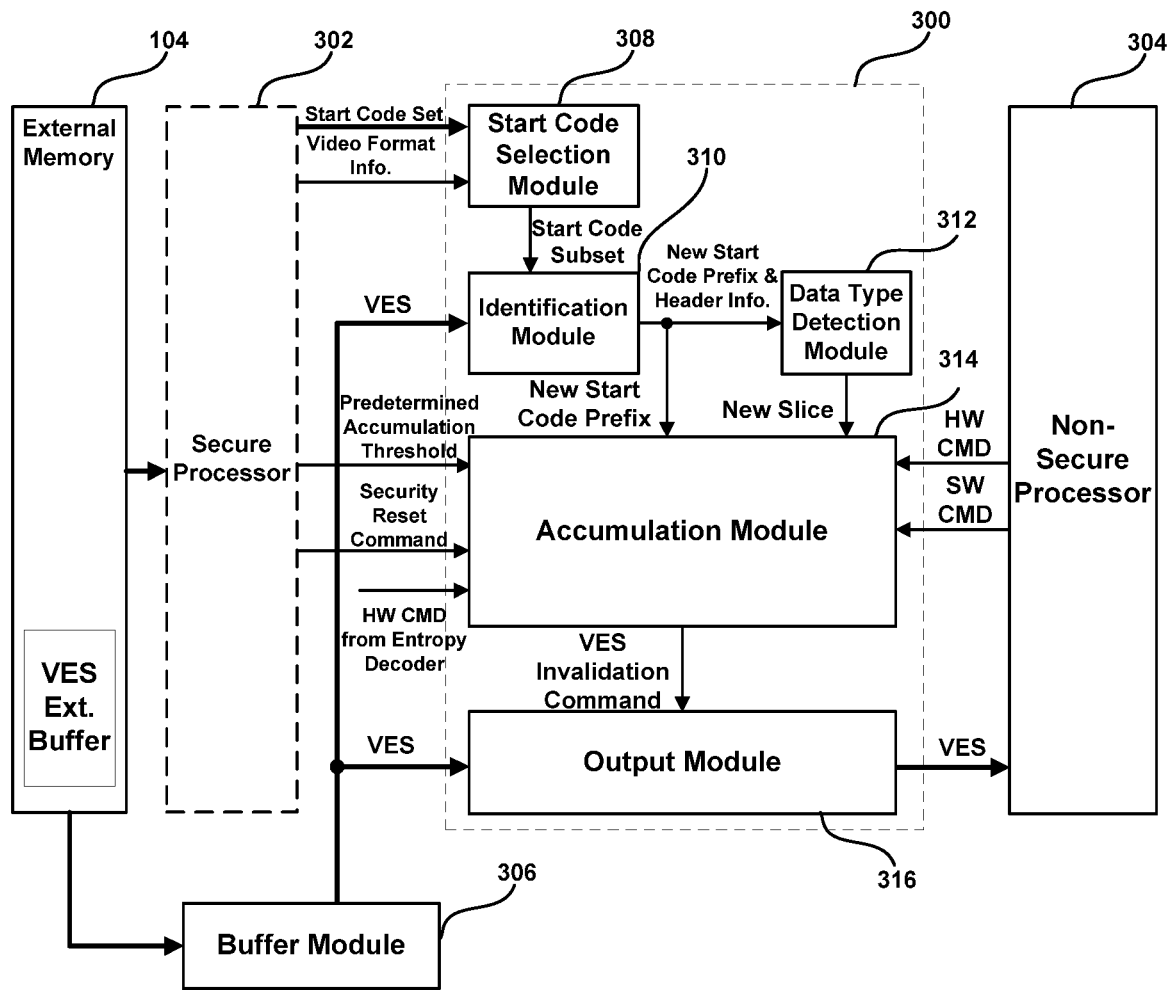
FIG. 3 shows the schematic of a video stream protection device 300 according to an embodiment of the present application.

FIG. 3 shows a video stream protection device 300 according to an embodiment of the present application. In some embodiments, the video stream protection device 300 can be arranged upstream of a non-secure layer of a video decoding system to control providing data of the video streams to a non-secure processor in a non-secure layer. For example, the video stream protection device 300 can be arranged in a secure layer of the video decoding system, for example, integrated in a video decoder in the secure layer, e.g., the video stream protection device 110 in the video decoder 106 shown in FIG. 1. In the following embodiments, the present application is described with reference to that the video stream protection device 300 is integrated within the video decoder, however, it can be appreciated that the video stream protection device can be arranged in any other manner as desired. The video decoder used herein refers to a decoder for hardware decoding video streams.

As shown in FIG. 3, the video stream protection device 300 is arranged between a secure processor 302 and a non-secure processor 304, and configured to receive from the secure processor 302 various control information for subsequent operations such as decoding video streams, and to receive from a buffer module video streams to be decoded. The buffer module 306 can be the VES internal buffer shown in FIG. 1, which is coupled to the external memory 105 to receive from the external memory 104 the video stream VES buffered by the external memory 104. The control information can be obtained directly from the external memory 104 by the secure processor 302, or can be generated by the secure processor 302 based on the received video stream. In some embodiments, the buffer module 306 can be an internal buffer (e.g. the VES internal buffer shown in FIG. 1) of the video decoder, which can, periodically or based on internal buffer condition, request for video streams from the external memory 104 outside of the video decoder. In some embodiments, the secure processor 302 can generate a portion or all of the control information based on video format information of the video streams. In some embodiments, the secure processor 302 can generate a portion or all of the control information based on video codec standards of all the video formats supported by the video decoder. For example, the secure processor 302 can generate a start code set and a predetermined accumulation threshold based on the video codec standards of all the video formats supported by the video decoder and/or the video format information, wherein the start code set includes one or more start codes each containing a start code prefix and a start code suffix (header information). In some embodiments, the video stream protection device 300 can work without the secure processor 302, and accordingly, the video stream protection device 300 can generate the start code set and the predetermined accumulation threshold based on the video codec standards of all the video formats supported by the video decoder, wherein the start code set can be preconfigured in a start code selection module 308 and the predetermined accumulation threshold can be preconfigured in an accumulation module 314. It can be appreciated that a portion of the functions of the video stream protection device can be omitted without the secure processor 302, for example, the security reset function can be omitted. The security reset function will be elaborated below.

The non-secure processor 304 can provide HW CMD (hardware command) commands and SW CMD (software command) commands to the video stream protection device 300 to decode data of video streams. In some embodiments, the HW CMD commands from the non-secure processor 304 are mainly used for search of start code prefixes of data units of the video streams in the video decoder. In some embodiments, an entropy decoder (not shown) can issue HW CMD commands to request for data of video streams for entropy decoding operations. Generally, the video stream protection device 300 may not return video stream data to the non-secure processor 304 after receipt of the HW CMD commands. Moreover, the video stream protection device 300 may set video stream data unavailable to the non-secure processor 304 from receipt of the HW CMD command till when such commands have been executed. The SW CMD commands are mainly used for performing software decoding on the video stream data by the non-secure processor 304. After receipt of the SW CMD commands, the video stream protection device 300 can select whether or not to respond to the SW CMD commands based on its working status (e.g. in a protection mode or not), i.e., select whether or not to provide to the non-secure processor 304 the video stream data. In some embodiments, in response to each SW CMD command, the video stream protection device 300 may return to the non-secure processor 304 certain length of video stream data.

In some embodiments, the video stream protection device 300 includes the start code selection module 308 which is used for receiving the start code set and information indicative of the video format of a video stream to be decoded. The start code selection module 308 is further used for selecting at least one start code prefix from the start code set based on the received video format information, as start code prefix(es) for identifying data units of the corresponding video streams. Optionally, the start code set may further include start code suffixes, i.e. the header information. Specifically, for video streams of different video formats, the start code prefixes and suffixes used by them may be different. For example, the H.264 format data units have start code prefixes which are 3-byte values such as "0x000001" and start code suffixes which are 1-byte values such as "0x01", "0x05" and so on. The H.264 slice data units may have start codes which are 4-byte values such as "0x00000101" and "0x00000105". The video streams of other video formats may have different start codes for their data units. For example, the AVS slice data units may have start codes ranging from a 4-byte value "0x00000100" to "0x000001AF". If the video format information provided by the secure processor 302 is the H.264 video format, then the start code selection module 308 may select from the start code set a start code prefix of a 3-byte value "0x000001", and slice start codes (including both start code prefixes and suffixes) of 4-byte values "0x00000101" and "0x00000101", etc. The selected start code prefix(es) and/or suffix(es) can be provided to the identification module 310 as a start code subset for subsequent use. In other words, in some embodiments, the start code subset contains one or more start code prefixes, and optionally start code suffixes, for video streams in conformity with certain specific video format. In some embodiments, there is no secure processor 302 or the secure processor 302 may not provide video format information, and accordingly, the start code subset may contain one or more start code prefixes, and optionally start code suffixes, of the start code set, which are generated according to the video codec standards of all the video codec formats supported by the video decoder.

After receiving the start code subset, the identification module 310 may determine the start code prefixes at respective start positions of all the data units of the received video stream based on the start code subset, and further identify these data units based on the respective start positions. For example, the identification module 310 may match to the data of the video stream, and determine that a data segment is the start code prefix of a data unit at the start position of the data unit, if such data segment matches with any start code prefix of the start code subset. Accordingly, data immediately after the start code prefix and before another subsequent start code prefix is identified as the main content of the data unit (e.g. the NAL data unit shown in FIG. 2).

It can be appreciated, in some embodiments, the video stream protection device may not have the start code selection module. Accordingly, the secure processor may provide to the video stream protection device start positions that help to identify data units of the video stream to be decoded, and optionally provide to the video stream protection device the data types of the data units. In this way, the identification module of the video stream protection device can process the video stream directly based on the start positions and/or data types of the data units received.

It should be noted that, no start code prefixes are defined for certain video codec standards such as the VP8 and VP9 standards. In such condition, other alternative manners can be used to determine the respective start positions of the data units. For example, video streams can be preprocessed to insert at respective start positions of their data units self-defined start code prefixes, or optionally other control information. In this way, the video stream protection device can further process the preprocessed video stream, and identify each data unit using the inserted self-defined start code prefix. For another example, the data length of the video stream can be monitored to determine the start position of each data unit. It can be appreciated that the present application does not limit how to identify the start positions of data units, which can be processed according to the actual condition of the video streams.

It can be appreciated that the header sections of data units in conformity with video codec standards without defining start code prefixes may not contain start code prefixes but contain header information. In the following, the embodiments are described with reference to that the header section of each data unit of the video stream contains a start code prefix, which should not limit the scope of the present application for persons skilled in the art.

After the identification module 310 identifies the data units, a data type detection module 312 further detects the header section (including the start code suffix) of each data unit. Specifically, the data type detection module 312 obtains the header information of the identified data unit, and determines the data type of the body section of the data unit based on the identified header information. For example, the data type detection module 312 may determine whether the processed data unit contains a body section whose data type is slice type. In some embodiments, the slice type may comprise one or more of the following data types: non instantaneous decoder refresh (IDR) picture coded slice, coded slice data partition A, coded slice data partition B, coded slice data partition C, IDR picture coded slice, coded slice extension, coded slice extension for depth view or 3D view. The H.264 video codec standard (i.e. the ITU-TH.264, ISO/IEC 14496-10 standards) or similar video codec standards can be referred to for more details of the slice type of the video format defined in the H.264 video codec standard. Still referring to the embodiment shown in FIG. 2, the NAL body section of the NAL data unit has a data type of slice type, and according to the H.264 video codec standard the body section further includes a slice header and slice data. The slice data can contain a set of continuous macroblocks or macroblock skip information, while the slice header can contain some global information (e.g. the type of the instant slice) relevant to the instant slice, e.g. information for decoding the marcoblocks of the slice data. It can be appreciated that, in other embodiments, the codec format of the video streams to be decoded can be, for example, HEVC/H.265, AVS/AVS+, AVS2, MPEG2, MPEG4, VC1. These video stream formats also define header sections and body sections, wherein each header section has a start code prefix at the start position of a data unit of the video stream, the header section also contains header information indicative of the data type of the corresponding body section, and the body section contains a body header and/or body data.

For example, an H.264 format data unit may have a header section with five least significant bits (i.e. the start code suffix) being "1" to "5", "20" or "21", indicating that the data type of the body section of such data unit is slice type. If the five least significant bits are of any other value, then the data type of the body section of the data unit is non-slice type. It can be appreciated that the data type detection module 312 can generate detection results reflecting whether the respective data units contain a slice body section, and provide such detection results to the accumulation module 314.

For another example, the H.265 video format can refer to ITU-T H.265 standard. The H.265 format data units having nal_unit_type values ranging from 0 to 31 are slice data units. For these slice data units, similar processing can be performed as the H.264 format, which will not repeated herein.

Figure 4:
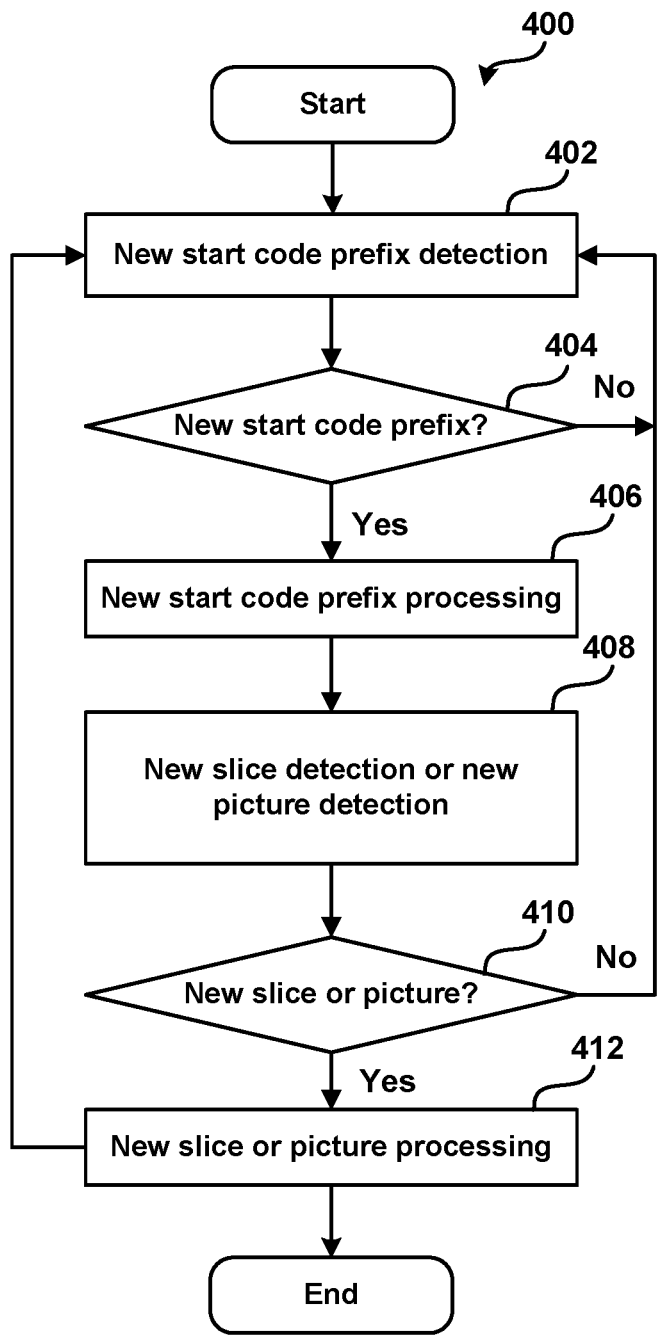
FIG. 4 shows an exemplary process 400 for identifying a data unit and detecting whether the data unit contains a body section whose data type is slice type.

FIG. 4 shows an exemplary process 400 for identifying data units and determining whether such data units contain body sections whose data types are slice type according to an embodiment of the present application. In some embodiments, the process 400 can be implemented by the identification module 310 and the data type detection module 312 shown in FIG. 3.

With references to FIGS. 3 and 4, in step 402, the identification module 310 may detect start code prefixes contained in the video stream according to the selected start code prefix. Then in step 404, if no new start code prefix is detected, indicating that the currently processed data unit does not end, then return to step 402 to continue detecting start code prefixes in the video stream. On the contrary, if a new start code prefix is detected, indicating that a new data unit is identified, then in step 406 the new start code prefix can be processed. In some embodiments, the processing of the new code prefix in step 406 can include generating a signal indicating the detection of the new start code prefix, i.e. identifying the new data unit. The identification module 310 can provide the signal to the data type detection module 312. Upon receiving the signal, the data type detection module 312 may determine that further processing of the identified data unit is needed. Specifically, in step 408, the data type detection module 312 may obtain the header information of the identified data unit, and determine the data type of the body section of the data unit according to the header information, for example, determine whether the data unit contains a body section whose data type is slice type or picture type (the picture type indicates that a picture is not divided into multiple slices but contained in a single data unit, which can be regarded as a special slice type since it also contains the specific video data). Afterwards, in step 410, if no new slice or picture data unit is detected but a data unit with control information is detected, i.e. a data unit containing a non-slice type body section is detected, then return to step 402. In the contrary, if it is detected that the identified data unit contains new slice or picture, then continue with step 412, and the data type detection module 312 can process the new slice or picture and generate a signal indicating the detection of a new slice or picture.

Still referring to FIG. 3, the accumulation module 314 receives the signal indicating the new start code prefix and the signal indicating the new slice or picture, and determines whether to enable or disable a protection mode according to these signals, i.e. whether to generate an invalidation command for prohibiting decoding the data of the data units conditionally. In the protection mode, the accumulation module 314 conditionally generates the invalidation command for prohibiting outputting the video stream data to the non-secure processor 304, such that the non-secure processor 304 cannot perform complete decoding of the video stream due to lack of enough data.

Figure 5:
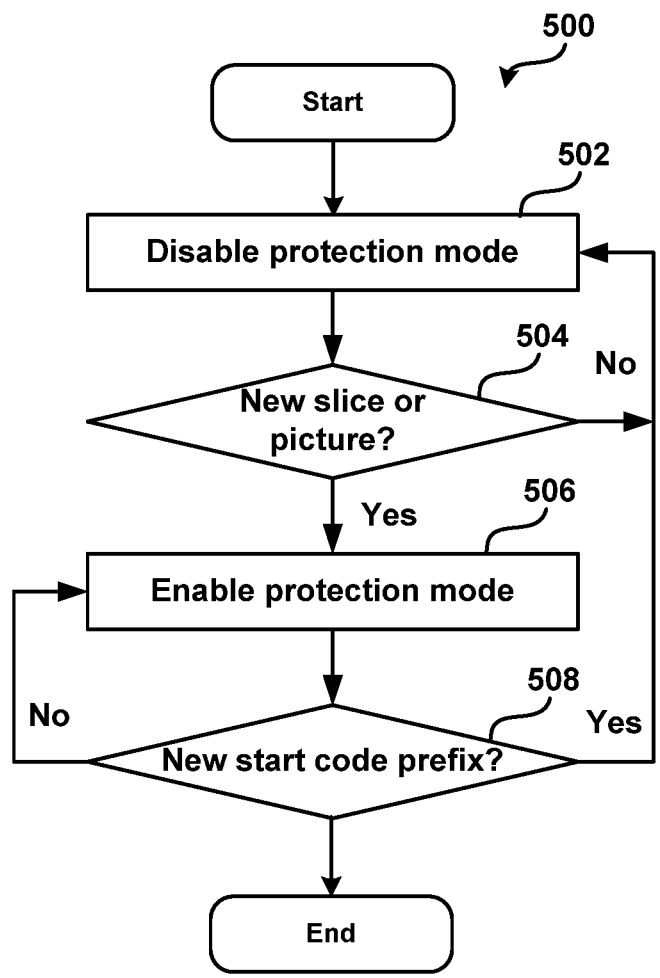
FIG. 5 shows an exemplary process 500 for enabling or disabling a protection mode according to an embodiment of the present application.

FIG. 5 shows an exemplary process 500 for enabling or disabling the protection mode according to an embodiment of the present application. In some embodiments, the process 500 can be implemented by the accumulation module 314 shown in FIG. 3.

As shown in FIG. 5, in step 502, for each data unit, initially the protection mode can be disabled. In step 504, if no signal indicating a new slice or picture is received, return to step 502, the protection mode is kept disabled. However, if a signal indicating a new slice or picture is received, continue with step 506 to enable the protection mode. More details relating to how to prohibit the outputting of the video stream in the protection mode will be elaborated below. During the disabling of the protection mode, in step 508, if a signal indicating receipt of a new start code prefix, indicating the completion of receiving the current data unit, then return to step 502, i.e. the protection mode is disabled for the next data unit by default. In contrast, if no signal indicating the receipt of a new start code prefix in step 508 is received, indicating the identified data unit having a body section whose data type is slice type (or picture type) is still being received, then return to step 506, the protection mode is kept enabled to protect the current data unit. It can be appreciated that initially the protection mode can be enabled for each data unit by default.

The accumulation module 314 may determine whether or not to enable the protection mode based on the process shown in FIG. 5. And when the protection mode is enabled, the accumulation module 314 may prohibit decoding the data of the body section of a data unit that has been determined as having a body section whose data type is slice type. For example, the accumulation module 314 may allow only sending to the non-secure processor 304 data not more than the predetermined accumulation threshold and allow the non-secure processor 304 to process such data. The accumulation module 314 may not allow the non-secure processor 304 to receive and decode the reminder of the data unit. As shown in FIG. 3, the accumulation module 314 may count decoded data of a data unit and determine whether the counted length exceeds the predetermined accumulation threshold. If the accumulation module 314 determines that the counted length exceeds the predetermined accumulation threshold, then it may generate the invalidation command for prohibiting decoding of the data, and send the invalidation command to an output module. In this way, the output module 316 may stop outputting to the non-secure processor 304 the subsequent data of the current data unit based on the invalidation command. It can be appreciated that the accumulation module 314 and the output module 316 together consist a portion of a control module which determines whether or not to prohibit decoding of data of a data unit based on the data type of the body section of the data unit.

In some embodiments, the accumulation module 314 may receive from a secure processor 302 the predetermined accumulation threshold, and determine based on the predetermined accumulation threshold a length of data that is allowed to be decoded by the non-secure processor 304. Optionally, the secure processor 302 may determine or estimate a specific value of the predetermined accumulation threshold based on the video format information used by the video stream being processed, for example, based on the maximum length of the header section and the body header of the body section of the data unit of such format. In some embodiments, the predetermined accumulation threshold can be set equal to or greater than the length of the header section and the body header of the body section of the data unit. For example, if the start code prefix, the start code suffix and the body section are accumulated, then the predetermined accumulation threshold can be equal to or greater than a maximum total length of the start code prefix, the start code suffix and the body header of the body section of a data unit of the corresponding video format. For another example, if only data of the body section is accumulated, then the predetermined accumulation threshold can be equal to or greater than the maximum length of the body header of a data unit of the corresponding video format. In this way, a portion of data of the body section of each data unit is provided to the non-secure processor 304 for decoding, and the non-secure processor 304 decodes the slice header information (or picture type header information) to enable the video decoder to decode the remaining data of the body section. However, the portion of data provided to the non-secure processor 304 is irrelevant to the key content of the video stream and thus may not leak the video content. In the contrary, if data of the body section of a data unit exceeds the predetermined accumulation threshold, then the remaining data of the slice body section cannot be provided to the non-secure processor 304, further protecting the video content.

In some other examples, for certain data units, their types can be identified by respective header information contained therein, and the predetermined accumulation threshold can be equal to or smaller than the length of the header section of a data unit with certain types. It can be appreciated that although in some circumstances not an entire header section of a data unit is decoded or obtained, the smaller amount of head information decoded from the header section can still suffice the determination of the types of the data units. For example, several most significant bits of the header section may provide sufficient information for the determination.

In some other examples, when certain specific types of data units are identified through their respective header information, such specific types of data units can be regarded as the body sections of their respective preceding data units, rather than regarded as new data units that are processed independently. As such, for these data units that are not processed independently, their content especially the data in the body sections of such specific types of data units cannot be decoded because the predetermined accumulation threshold may be exceeded for the preceding data unit.

In some other embodiments, the predetermined accumulation threshold can be preconfigured in the accumulation module 314 and may not need additional configuration by the secure processor 302. For example, the predetermined accumulation threshold can be configured as a maximum length of a header section and a body header of a body section of a data unit in conformity with all the video codec standards defined by these standards.

It can be appreciated that, the above embodiments are described with reference to identifying and prohibiting data units having body sections whose data types are slice type. In some alternative embodiments, the video stream protection method of the present application can be used to identify data units having body sections whose data types are non-slice types and allow software decoding such data units. In some other embodiments, the data types of the body sections of data units desired to be protected or unprotected can be defined based on application needs or other requirements, which is not limited herein.

In some embodiments, the secure processor 302 may further provide to the accumulation module 314 a security reset command for resetting the protection mode, for example, to have the accumulation module 314 quit the protection mode for the current data unit. The security reset command provides an additional control strategy for enabling/disabling the protection mode. It can be appreciated that in some embodiments the security reset command may not be provided to reset the protection mode.

Figure 6:
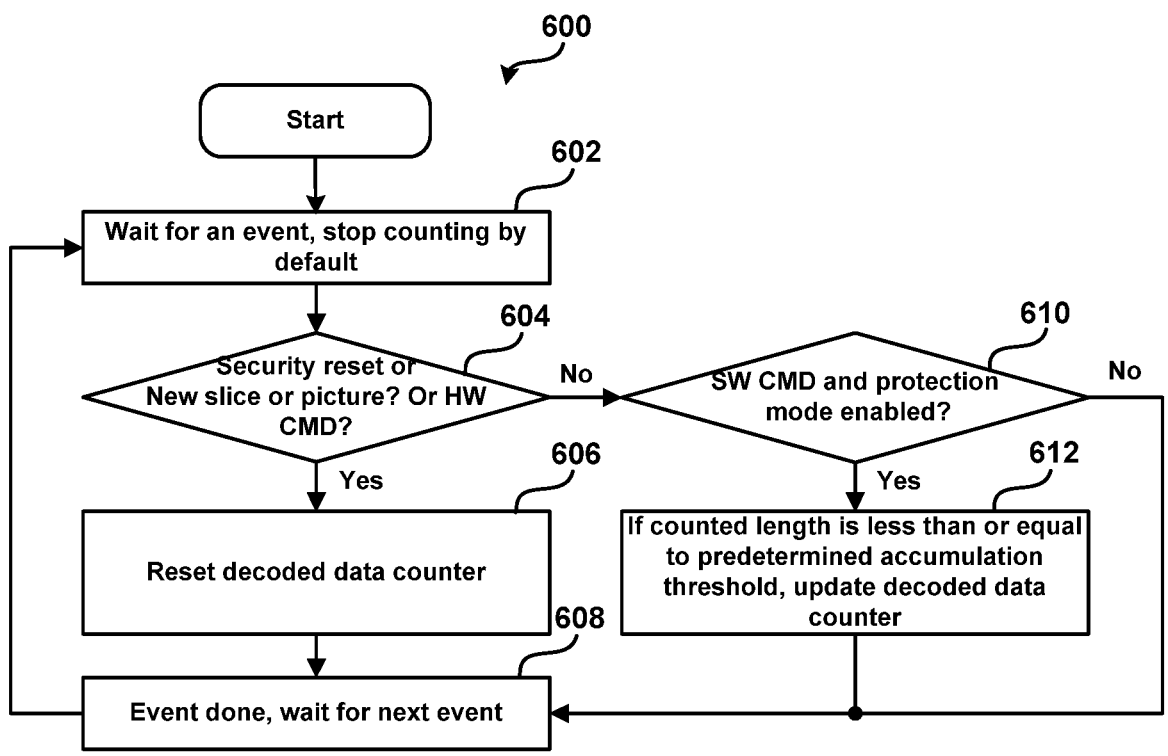
FIG. 6 shows an exemplary process 600 for counting decoded data by an accumulation module according to an embodiment of the present application.

FIG. 6 shows an exemplary process 600 for counting decoded data by the accumulation module according to an embodiment of the present application. In some embodiments, the process 600 can be implemented by the accumulation module 314 shown in FIG. 3.

As shown in FIG. 6, the process 600 starts with step 602, and the accumulation module waits for an event. In some embodiments, the event can be a security reset command, detection of a new slice and a new picture, a SW CMD command, or receiving a HW CMD command. In step 604, based on the signal input to the accumulation module or optionally based on whether a HW CMD command is received (receiving the HW CMD command indicates that the remaining data of the current data unit will be processed by the video decoder), it can be determined whether security reset command is received, or whether a new slice or a new picture is received. If the security reset command is received, or a new slice or a new picture is received, or optionally the HW CMD command is received, then in step 606 a decoded data counter (not shown) is reset. The decoded data counter is set in the accumulation module and used for counting decoded data of a data unit. Resetting the decoded data counter indicates that the counting of the current data unit is completed and the counting of the next data unit is ready, i.e. the process proceeds with step 608. In the contrary, if no security reset command is received, and no new slice or picture is received, and optionally no HW CMD command is received, indicating that the current data unit is being processed, then the process proceeds with step 610. In step 610, it is further determined whether a SW CMD command sent from the non-secure processor is received and whether the protection mode is enabled. If no SW CMD command is received, indicating that the non-secure processor does not continue to request for data of the data unit, then the counting can be stopped. Moreover, if it is detected that the protection mode is not enabled, indicating that it is not needed to prohibit outputting data of the data unit to the non-secure processor, then the counting can be stopped. In the contrary, if in step 610 the SW CMD command is received and the protection mode is enabled, then the process proceeds with step 612. In step 612, if the counted length provided by the decoded data counter is equal to or smaller than the predetermined accumulation threshold, then the value in the decoded data counter can be updated based on the decoded or outputted length of data of the data unit. If the counted length exceeds the predetermined accumulation threshold, then the counting is stopped, and an invalidation command is outputted to the output module 316 shown in FIG. 3, indicating that the counted length of the decoded data exceeds the predetermined accumulation threshold and the output module 316 should stop outputting data to the non-secure processor. Afterwards, the processing of the current event is completed and the process proceeds with step 608 to wait for the next event.

Figure 7:
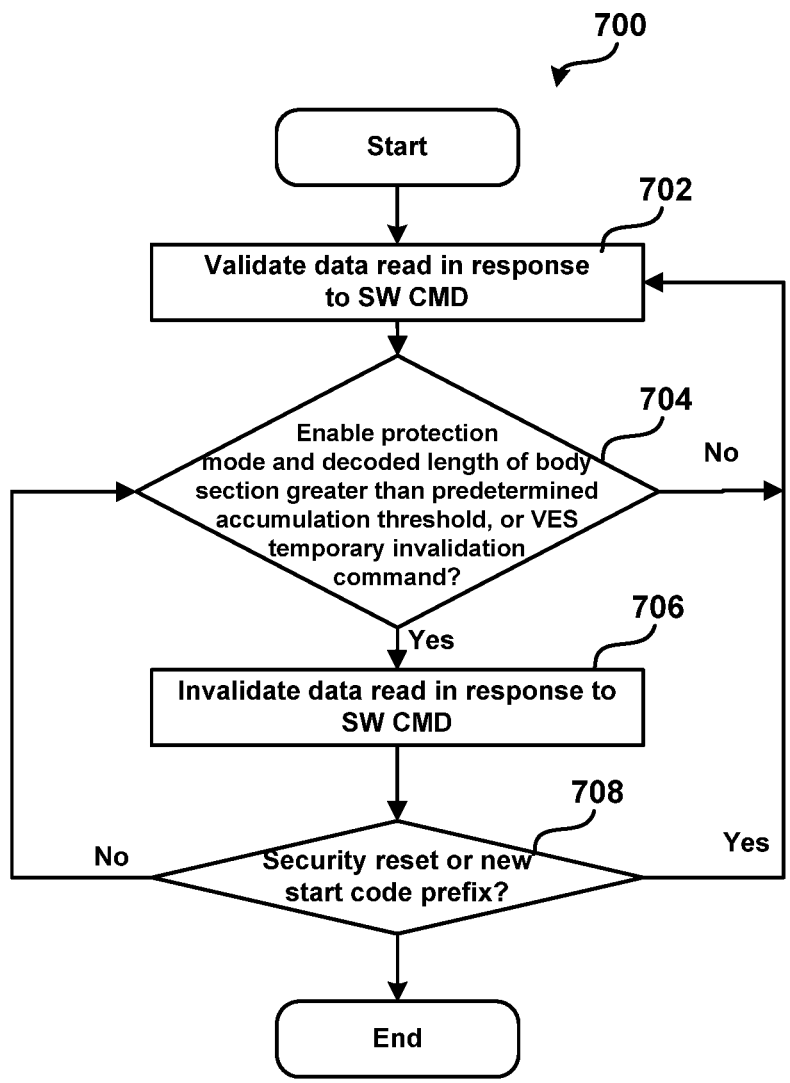
FIG. 7 shows an exemplary process 700 for prohibiting decoding data of a video stream in the protection mode according to an embodiment of the present application.

FIG. 7 shows an exemplary process 700 for prohibiting decoding of video streams in the protection mode according to an embodiment of the present application. The process 700 may be implemented by the accumulation module 314 and the output module 316 shown in FIG. 3.

As shown in FIG. 7, in step 702, an initial state can be set by default to validate data of a video stream read in response to a SW CMD command sent from the non-secure processor, i.e. no invalidation command for prohibiting decoding of the data of the data unit is generated. In this way, the data of the data units in the video stream can be provided to the non-secure processor. Specifically, a portion of data of the data units having body sections whose data types are slice type can be provided to the non-secure processor. During that period, the accumulation module may count the decoded data of a data unit according to the process 600 shown in FIG. 6. Afterwards, in step 704, if it is determined that the protection mode is enabled and the length of the decoded data exceeds the predetermined accumulation threshold or the invalidation command for invalidating the VES temporarily, then the process proceeds with step 706, the data of the video stream read in response to the SW CMD command sent from the non-secure processor may be invalidated, and then subsequent data of the current data unit cannot be obtained by the non-secure processor. In some embodiments, invalidating the data of the video stream can be implemented by sending to the non-secure processor invalid data or random data irrelevant to the data unit of the video stream. After that, in step 708, if a security reset command or a new start code prefix is detected, then the process returns to step 702, and if no security reset command and a new start code prefix is received, then the process returns to step 704. In step 704, if it is detected that the protection mode is disabled or it is detected that the length of the decoded data does not exceed the predetermined accumulation threshold, and a VES invalidation command is not received, then the process proceeds with step 702, the data of the video stream can still be provided to the non-secure processor in response to SW CMD command sent from the non-secure processor.

In some embodiments, the process 700 can be performed each time the data of a data unit is decoded to update the counted length of the decoded data in real time.

In some circumstances, the non-secure processor may try to obtain the entire data of each data unit by requesting a small portion of data of a data unit every time but repeating data requesting multiple times. The access address of the video stream in the buffer module may be modified each time the non-secure processor requests for data. The modified access address can be directed to an address subsequent to the address of the last data read by a previous SW CMD command. In this way, the non-secure processor can obtain the entire data of a data unit without repeatedly reading data. In order to avoid such circumstances, in some embodiments of the present application, a video stream temporary invalidation command can be used to prohibit such operations.

Figure 8:
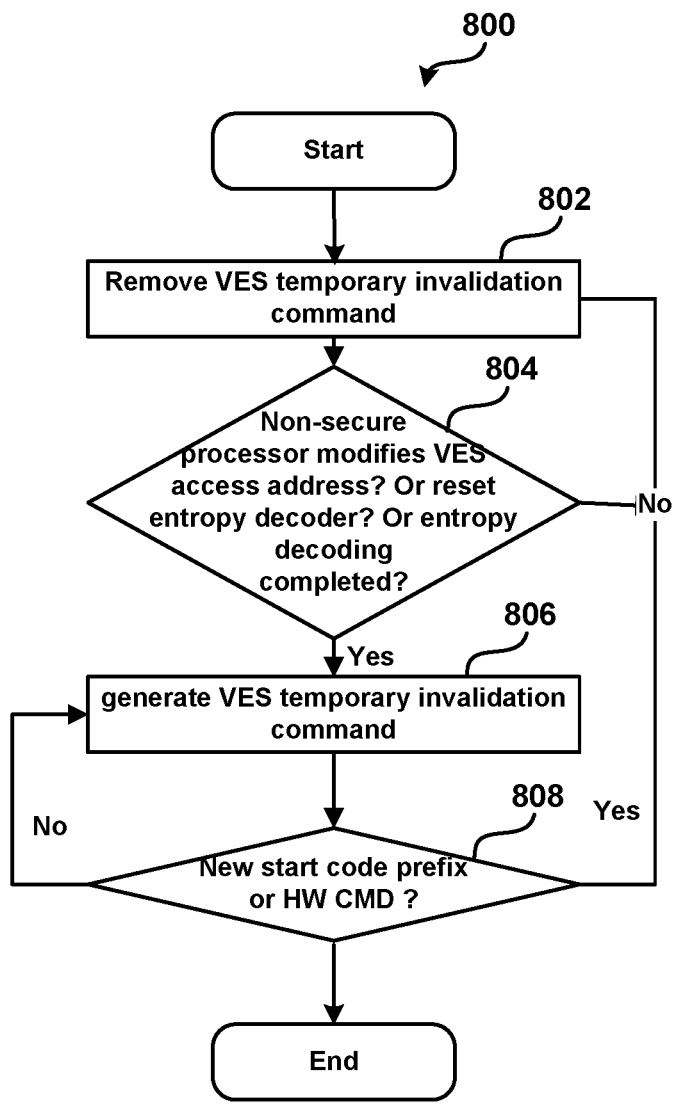
FIG. 8 shows an exemplary process 800 for generating an invalidation command that invalidates the video stream temporarily based on modification to read address according to an embodiment of the present application.

FIG. 8 shows an exemplary process 800 for generating video stream temporary invalidation commands to avoid modification to an access address of a video stream by the non-secure processor according to an embodiment of the present application. The process 800 can be implemented by the accumulation module 314 shown in FIG. 3 and can be implemented for decoding of each data unit.

As shown in FIG. 8, in step 802, initially it is configured by default that no video stream temporary invalidation command is generated for a data unit currently being decoded. Afterwards, in step 804, it is detected whether a command for modifying an access address of a video stream by the non-secure processor is received, or optionally whether a command for resetting an entropy decoder is received, or optionally a command indicating whether all entropy decoding operations for the currently processed data unit will be stopped. If no command for modifying the access address by the non-secure processor is received, and optionally no command for resetting the entropy decoder is received, and optionally no command indicating to stop all entropy decoding operations for the currently processed data unit is received, then the process returns to step 802, and the video stream temporary invalidation command is still cleared or not generated. However, if a command for modifying the access address by the non-secure processor is received, or optionally a command for resetting the entropy decoder is received, or optionally a command indicating to stop all entropy decoding operations for the currently processed data unit is received, then the process proceeds with step 806 and the video stream temporary invalidation command is generated. The video stream temporary invalidation command can be provided to the accumulation module 314 and the output module 316 shown in FIG. 3, such that the output module 316 may prohibit providing to the non-secure processor new data of the currently processed data unit in line with the process shown in FIG. 7, or send to the non-secure processor invalid data. Afterwards, in step 808, it is determined whether a new start code prefix is detected, or optionally whether a HW CMD command for searching for a start code prefix of a data unit of the video stream sent by the non-secure processor 304 shown in FIG. 3 is detected. If either one of the two conditions is detected, indicating that the decoding of the current data unit is completed, then the process may proceed with step 802, and it is configured that the video stream temporary invalidation command is clearly by default for a new data unit.

FIGS. 9A to 9E show how a video stream protection device works according to various embodiments of the present application.

Figure 9A:
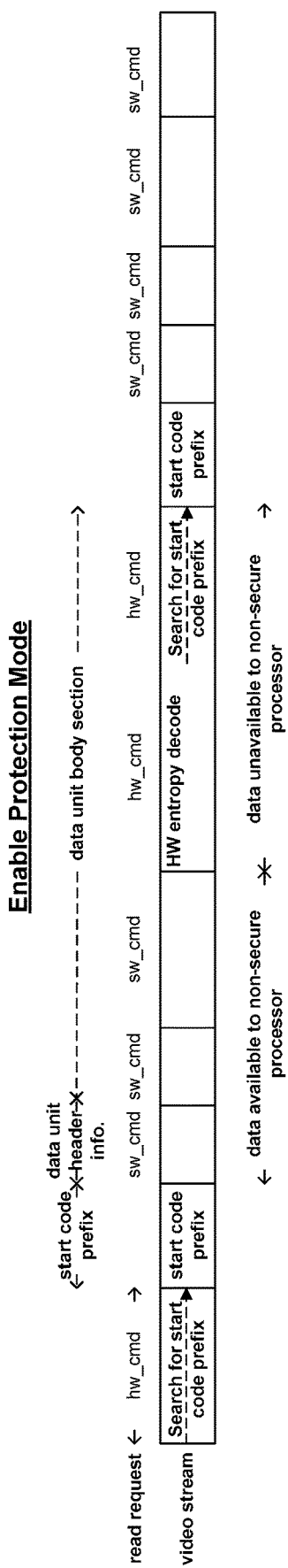
FIGS. 9A to 9E show how a video stream protection device works according to various embodiments of the present application.

As shown in FIG. 9A, a diagram showing how the video stream protection device performs normal protection for a video stream. At the beginning, the non-secure processor may send to the video stream a HW CMD command such that the video stream protection device may search in the video stream for a start code prefix of data unit. After a start code prefix and the corresponding video stream data unit are identified, the video stream protection device may respond to a SW CMD command sent from the non-secure processor. Specifically, for the first three SW CMD commands, the video stream protection device may send to the non-secure processor data corresponding to these SW CMD commands, since the requested data length of the data unit does not exceed the predetermined accumulation threshold. In some embodiments, the data available to the non-secure processor generally corresponds to the data of the header section and the body header of the body section of the data unit. After transmission of the header section data of the data unit, the video stream protection device further detects whether the body section has a data type of slice type, i.e. whether a signal indicating a new slice is received as shown in FIG. 5. At this time, the protection mode for the video stream may be enabled to prohibit sending to the non-secure processor the remainder of the currently processed data unit, which is mainly the body data of the body section of the data unit. Thus, the partial data of the body section of the data unit is not available to the non-secure processor, which cannot obtain such data for decoding. In this way, the non-secure processor cannot obtain the entire data of the current data unit, and thus the key content of the video stream can be protected effectively.

Figure 9B:
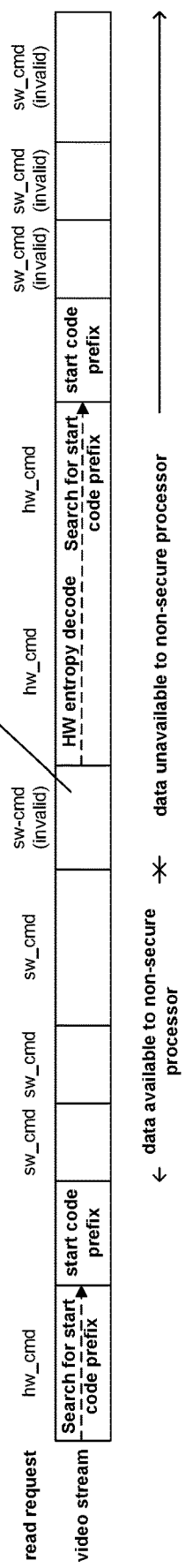
Figure 9C:
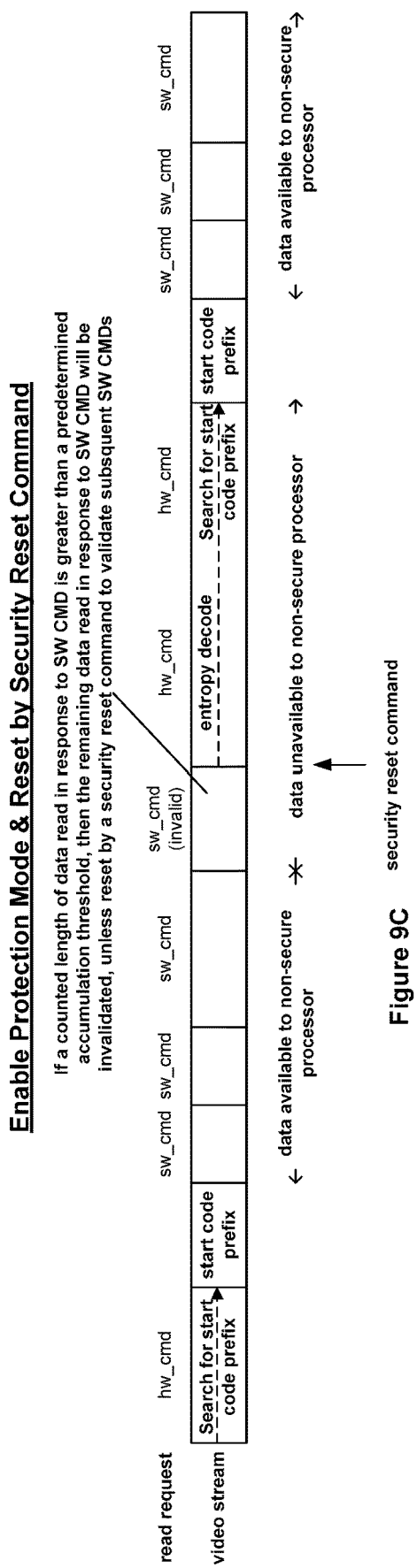

As shown in FIGS. 9B and 9C, a process is shown that the video stream protection device performs protection for the video stream and further quits invalidating data read in response to the SW CMD commands through the security reset command. Moreover, the decoded data counter may be reset by the security reset command.

Specifically, as shown in FIG. 9B, after data of the current data unit has been sent to the non-secure processor in response to three SW CMD commands, the video stream protection device does not respond to subsequent SW CMD commands. However, since the secure processor does not provide the security reset command, the video stream protection device may generate the invalidation command afterwards, i.e. the SW CMD command sent by the non-secure processor may not be responded. Accordingly, the remaining data of the current data unit and all data included in the subsequent data unit are all unavailable to the non-secure processor. In the contrary, as shown in FIG. 9C, after data of the data unit has been sent to the non-secure processor in response to three SW CMD commands, the video stream protection device may not respond to the following SW CMD commands. The secure processor may then send to the video stream protection device the security reset command. In response to the security reset command, the video stream protection device may not generate the invalidation command and may allow responding to the subsequent SW CMD command sent by the non-secure processor again, which is the transition from step 708 to step 702 shown in FIG. 7. In this way, when the start code prefix of the next data unit is detected, the video stream protection device may resume sending to the non-secure processor the previous portion of data of the data unit.

Figure 9D:
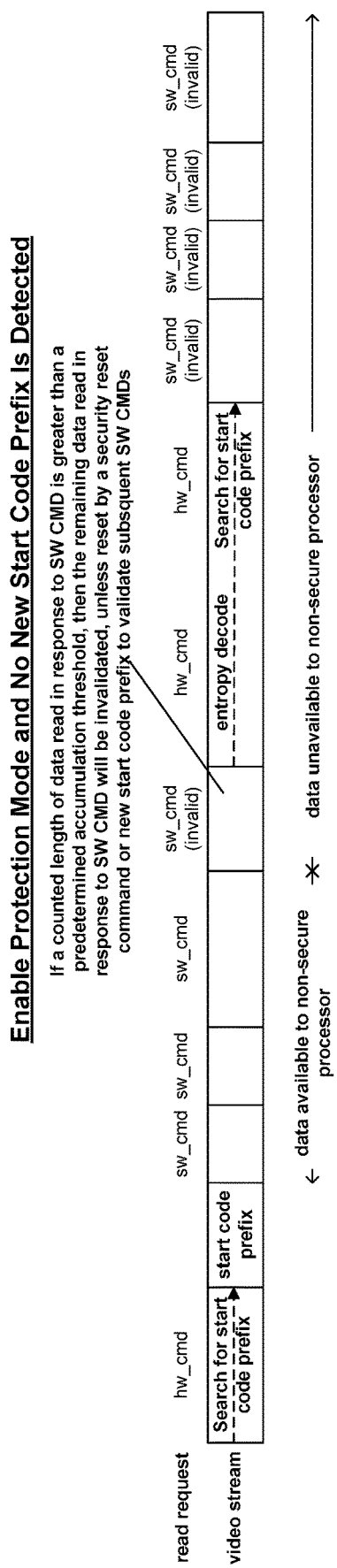
Figure 9E:
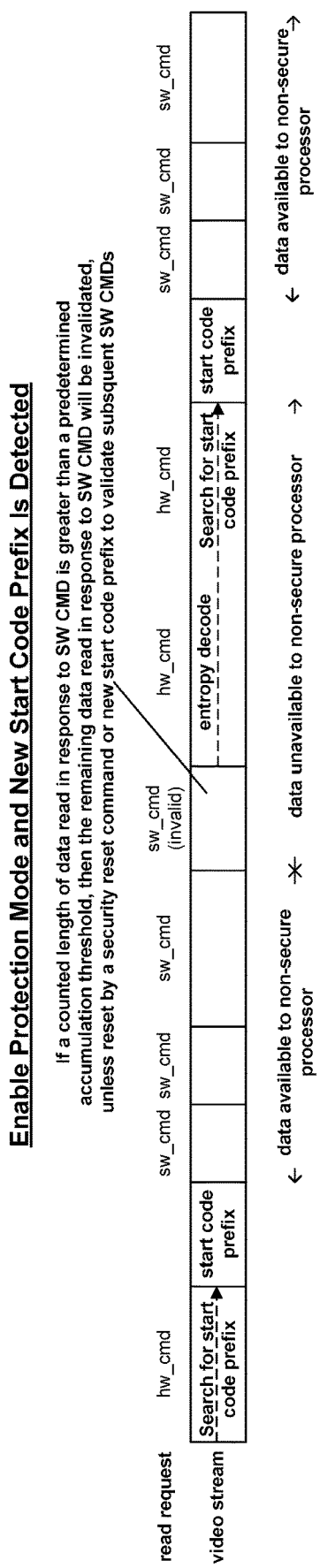

As shown in FIGS. 9D and 9E, a processor is shown that the video stream protection device performs protection for the video stream and quits invalidating data read in response to the SW CMD commands through detecting a new start code prefix. The embodiment shown in FIGS. 9D and 9E differs from that shown in FIGS. 9B and 9C in that they have different conditions for triggering quitting data invalidation. In the embodiment shown in FIGS. 9D and 9E, the quitting operation is triggered by detection of the start code prefix instead of receipt of the security reset command. It can be appreciated that in some other embodiments such as the process shown in FIG. 6, the quitting operation can be triggered by detection of the HW CMD command.

Specifically, as shown in FIG. 9D, after data of the current data unit has been sent to the non-secure processor in response to three SW CMD commands, the video stream protection device does not respond to subsequent SW CMD commands. In the following process, the video stream may not contain a start code prefix, and thus the video stream protection device may generate invalidation commands, i.e. the SW CMD commands sent by the non-secure processor may not be responded. In the contrary, as shown in FIG. 9E, after data of the data unit has been sent to the non-secure processor in response to three SW CMD commands, the video stream protection device may not respond to the following SW CMD commands. When the video stream protection device detects a new start code prefix of the next data unit, as the transition from step 708 to step 702 shown in FIG. 7, the video stream protection device may resume responding to the SW CMD command sent from the non-secure processor and send to the non-secure processor the previous portion of data of the data unit.

Figure 10:
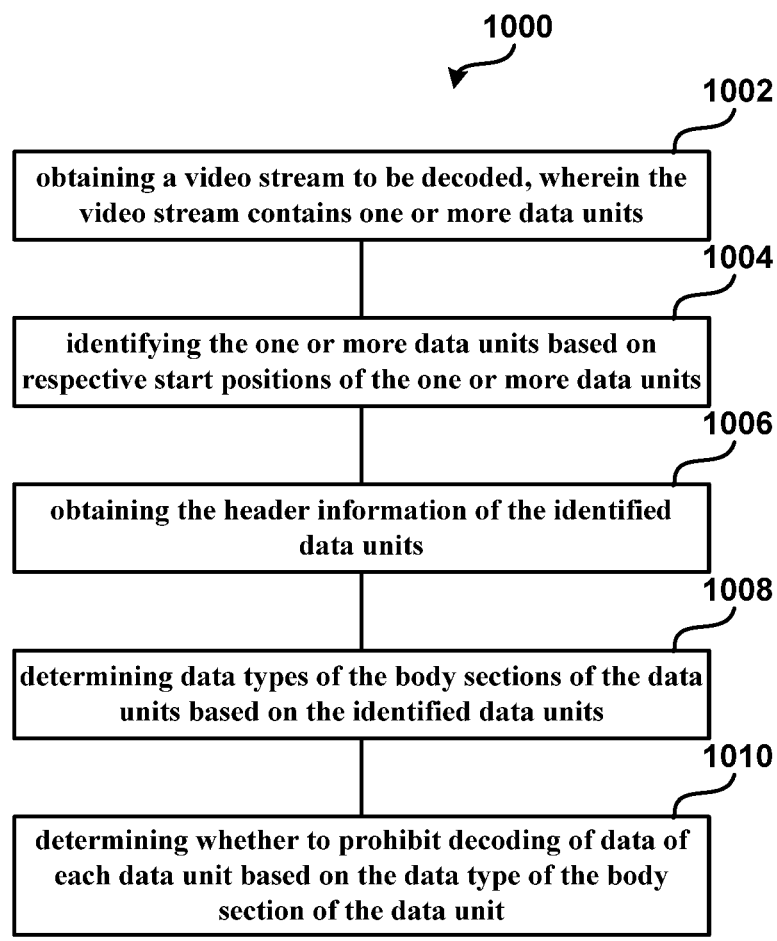
FIG. 10 shows a video stream protection method 1000 according to an embodiment of the present application.

FIG. 10 shows an exemplary video stream protection method 1000 according to an embodiment of the present application. In some embodiments, the video stream protection method 1000 may implemented by the video stream protection device shown in FIG. 3.

As shown in FIG. 10, the video stream protection method 1000 comprises: step 1002, a video stream to be decoded is obtained, wherein the video stream contains one or more data units each having a header section and a body section, and the header section contains header information indicative of a data type of the corresponding body section; step 1004, the one or more data units are identified based on respective start positions of the one or more data units; step 1006, the header information of the identified data units is obtained; step 1008, data types of the body sections of the data units based on the identified data units are determined; and step 1010, it is determined whether to prohibit decoding of data of each data unit based on the data type of the body section of the data unit.

More details of the video stream detection method can refer to the descriptions of the video stream protection devices according to embodiments of the present application, which will not elaborated herein.

It should be noted that, although various steps, sub-steps, modules or sub-modules of video stream protection methods and devices are mentioned in the forgoing detailed description, such division is merely exemplary but not mandatory. In fact, according to the embodiments of the application, features and functions of two or more modules described above can be specified in one module. On the contrary, features and functions of one module described above can be further divided into multiple modules to be specified.

Those skilled in the art may understand and implement other variations to the disclosed embodiments from a study of the drawings, the disclosure, and the appended claims. In the claims, the terms "comprise" or "comprising" do not exclude other elements or steps, and the terms "a" or "an" do not exclude a plurality. In practical applications according to the present application, one element may perform functions of several technical features recited in claims. Any reference symbols in the claims should not be construed as limiting the scope.

What is claimed is:

1. A video stream protection method, comprising:
A) obtaining a video stream to be decoded, wherein the video stream contains one or more data units each having a header section and a body section, and the header section contains header information indicative of a data type of the corresponding body section;
B) identifying the one or more data units based on respective start positions of the one or more data units;
C) obtaining the header information of the identified data units;
D) determining data types of the body sections of the data units based on the identified data units; and
E) determining whether to prohibit decoding of data of each data unit based on the data type of the body section of the data unit.

2. The video stream protection method of claim 1, wherein the video stream is in conformity with the H.264 or H.265 video codec standard, and the data units are network abstraction layer (NAL) data units.

3. The video stream protection method of claim 1, wherein the video stream is in conformity with the MPEG2, MPEG4, VC1, AVS/AVS+ or AVS2 video codec standard, and each data unit is a data unit of the video stream which starts with a start code.

4. The video stream protection method of claim 1, wherein the video stream is preprocessed to insert therein predetermined start code prefixes, and each data unit is a data unit of the preprocessed video stream which starts with a predetermined start code prefix.

5. The video stream protection method of claim 1, wherein step E further comprises:
for a data unit having a body section whose data type is slice type, prohibiting decoding data of the body section of the data unit.

6. The video stream protection method of claim 5, the video stream is in conformity with the H.264 video codec standard, the data units are NAL data units, and the slice type comprises one or more of the following data types of the NAL data units: non instantaneous decoder refresh (IDR) picture coded slice, coded slice data partition A, coded slice data partition B, coded slice data partition C, IDR picture coded slice, coded slice extension, coded slice extension for depth view or 3D view.

7. The video stream protection method of claim 1, wherein step B further comprises:
obtaining information indicative of a video format of the video stream to be decoded;
determining one or more start code prefixes corresponding to the video stream based on the information indicative of the video format of the video stream to be decoded, wherein each start code prefix is at a start position of a data unit of the video stream; and
identifying the start position of each data unit based on the one or more start code prefixes to identify each data unit of the video stream.

8. The video stream protection method of claim 1, wherein step B further comprises:
obtaining one or more start code prefixes corresponding to the video stream to be decoded, wherein each start code prefix is at a start position of a data unit of the video stream; and
identifying the start position of each data unit based on the start code prefixes to identify each data unit of the video stream.

9. The video stream protection method of claim 1, where in step E, prohibiting decoding of data of the data unit comprises:
for a data unit having a body section whose data type is slice type, permitting only decoding data of the data unit not greater than a predetermined accumulation threshold.

10. The video stream protection method of claim 9, wherein the body section comprises a body header and/or body data, and the predetermined accumulation threshold is equal to or greater than a total length of the header section and the body header of the data unit.

11. The video stream protection method of claim 9, wherein
for a data unit having a body section whose data type is slice type, permitting only decoding of the data of the data unit not greater than a predetermined accumulation threshold comprises:
receiving the predetermined accumulation threshold;
for a data unit that has been determined having a body section whose data type is slice type, counting a length of the decoded data of the data unit; and
stopping providing the data that is prohibited to be decoded to a non-secure processor that performs software decoding operation on the video stream when the counted length exceeds the predetermined accumulation threshold.

12. The video stream protection method of claim 1, wherein the video stream to be decoded is provided from a video stream data source to a video decoder for hardware decoding and further to a non-secure processor for software decoding via the video decoder, wherein the non-secure processor is configured to perform software decoding on the video stream, and the video stream protection method is implemented by the video decoder to stop providing to the non-secure processor data that is prohibited to be decoded.

13. A non-transient computer readable storage medium in which executable instructions are stored, wherein the executable instructions can be executed by a processor to perform to the following operations:
A) obtaining a video stream to be decoded, wherein the video stream contains one or more data units each having a header section and a body section, and the header section contains header information indicative of a data type of the corresponding body section;
B) identifying the one or more data units based on respective start positions of the one or more data units;
C) obtaining the header information of the identified data units;
D) determining data types of the body sections of the data units based on the identified data units; and
E) determining whether to prohibit decoding of data of each data unit based on the data type of the body section of the data unit.

14. The non-transient computer readable storage medium of claim 13, wherein the video stream is in conformity with the H.264 or H.265 video codec standard, and the data units are network abstraction layer (NAL) data units.

15. The non-transient computer readable storage medium of claim 13, wherein the video stream is in conformity with the MPEG2, MPEG4, VC1, AVS/AVS+ or AVS2 video codec standard, and each data unit is a data unit of the video stream which starts with a start code.

16. The non-transient computer readable storage medium of claim 13, wherein the video stream is preprocessed to insert therein predetermined start code prefixes, and each data unit is a data unit of the preprocessed video stream which starts with a predetermined start code prefix.

17. The non-transient computer readable storage medium of claim 13, wherein step E further comprises:
for a data unit having a body section whose data type is slice type, prohibiting decoding data of the body section of the data unit.

18. The non-transient computer readable storage medium of claim 13, wherein the video stream is in conformity with the H.264 video codec standard, the data units are NAL data units, and the slice type comprises one or more of the following data types of the NAL data units: non instantaneous decoder refresh (IDR) picture coded slice, coded slice data partition A, coded slice data partition B, coded slice data partition C, IDR picture coded slice, coded slice extension, coded slice extension for depth view or 3D view.

19. The non-transient computer readable storage medium of claim 13, wherein step B further comprises:
obtaining information indicative of a video format of the video stream to be decoded;

determining one or more start code prefixes corresponding to the video stream based on the information indicative of the video format of the video stream to be decoded, wherein each start code prefix is at a start position of a data unit of the video stream; and identifying the start position of each data unit based on the one or more start code prefixes to identify each data unit of the video stream.

20. The non-transient computer readable storage medium of claim 19, wherein step B further comprises:

determining the header information corresponding to the video stream based on the information indicative of the video format of the video stream to be decoded.

21. The non-transient computer readable storage medium of claim 13, wherein step B further comprises:

obtaining one or more start code prefixes corresponding to the video stream to be decoded, wherein each start code prefix is at a start position of a data unit of the video stream; and identifying the start position of each data unit based on the start code prefixes to identify each data unit of the video stream.

22. The non-transient computer readable storage medium of claim 21, wherein step B further comprises:

determining the header information corresponding to the video stream based on the information indicative of the video format of the video stream to be decoded.

23. The non-transient computer readable storage medium of claim 13, where in step E, prohibiting decoding of data of the data unit comprises:

for a data unit having a body section whose data type is slice type, permitting only decoding data of the data unit not greater than a predetermined accumulation threshold.

24. The non-transient computer readable storage medium of claim 23, wherein the body section comprises a body header and/or body data, and the predetermined accumulation threshold is equal to or greater than a total length of the header section and the body header of the data unit.

25. The non-transient computer readable storage medium of claim 23, wherein for a data unit having a body section whose data type is slice type, permitting only decoding data of the data unit not greater than a predetermined accumulation threshold further comprises:

receiving the predetermined accumulation threshold;

for a data unit that has been determined having a body section whose data type is slice type, counting a length of the decoded data of the data unit; and stopping providing the data that is prohibited to be decoded to a non-secure processor that performs software decoding operation on the video stream when the counted length exceeds the predetermined accumulation threshold.

26. The non-transient computer readable storage medium of claim 13, wherein the video stream to be decoded is provided from a video stream data source to a video decoder for hardware decoding and further to a non-secure processor for software decoding via the video decoder, wherein the non-secure processor is configured to perform software decoding on the video stream, and the video stream protection method is implemented by the video decoder to stop providing to the non-secure processor data that is prohibited to be decoded.

* * * * *